US006564955B2

(12) United States Patent
Franzen et al.

(10) Patent No.: US 6,564,955 B2
(45) Date of Patent: May 20, 2003

(54) MOBILE HARBOR CRANE FOR THE COMBINED HANDLING OF CONTAINERS AND BULK MATERIALS

(75) Inventors: Hermann Franzen, Mönchengladbach (DE); Joachim Kröll, Jüchen (DE); Janis Moutsokapas, Monheim (DE)

(73) Assignee: Gottwald Port Technology GmbH, Düsseldorf (DE)

(*) Notice: Subject to any disclaimer, the term of this patent is extended or adjusted under 35 U.S.C. 154(b) by 0 days.

(21) Appl. No.: 09/790,366

(22) Filed: Feb. 22, 2001

(65) Prior Publication Data

US 2001/0052507 A1 Dec. 20, 2001

(30) Foreign Application Priority Data

Feb. 23, 2000 (DE) ........................................ 100 09 736

(51) Int. Cl.[7] ................................................ B62D 61/10

(52) U.S. Cl. ....................... 212/301; 212/312; 212/224; 180/23

(58) Field of Search ................................ 212/301, 224, 212/312; 180/23

(56) References Cited

U.S. PATENT DOCUMENTS

| | | | | | |
|---|---|---|---|---|---|
| 2,268,017 | A | * | 12/1941 | Busick et al. | 280/6 |
| 2,940,769 | A | * | 6/1960 | Taylor | 280/43.23 |
| 2,991,890 | A | * | 7/1961 | Kennedy | 212/8 |
| 3,280,931 | A | * | 10/1966 | Cahill et al. | 180/23 |
| 3,545,627 | A | * | 12/1970 | Letourneau | 212/38 |
| 3,638,805 | A | * | 2/1972 | Garnier | 212/38 |
| 3,664,448 | A | * | 5/1972 | Hudis | 180/9.46 |
| 3,680,653 | A | * | 8/1972 | Murata et al. | 180/23 |
| 3,767,030 | A | * | 10/1973 | Briggs et al. | 198/36 |
| 3,792,745 | A | * | 2/1974 | Files | 180/9.46 |
| 3,868,022 | A | * | 2/1975 | Greenlay et al. | 212/8 R |
| 3,899,037 | A | * | 8/1975 | Yuker | 180/6.48 |
| 4,200,162 | A | * | 4/1980 | Tax | 180/23 |
| 4,555,031 | A | * | 11/1985 | Blase et al. | 212/189 |
| 2001/0020558 | A1 | | 9/2001 | Franzen et al. | 180/418 |

FOREIGN PATENT DOCUMENTS

| | | | |
|---|---|---|---|
| DE | 100 111 594 | 9/2001 | B62D/7/04 |

* cited by examiner

*Primary Examiner*—Thomas J. Brahan
(74) *Attorney, Agent, or Firm*—Cohen, Pontani, Lieberman & Pavane

(57) ABSTRACT

A mobile harbor crane for the combined handling of containers and bulk materials, having an undercarriage and an upper carriage which is mounted rotatably on the base frame of the undercarriage and on which a tower with a boom that can be pivoted about a horizontal axis is arranged. Four support beams are connected pivotally to a base frame of the undercarriage, symmetrically to the longitudinal and transverse axes of the vehicle, in such a way that they can each be pivoted about vertical axes, they are provided at their free ends with vertically acting leveling cylinders, by means of which the support beams are supported on the wheels of a plurality of traveling gear assemblies via balancers for uniform distribution of the supporting forces.

5 Claims, 8 Drawing Sheets

MOBILE HARBOR CRANE FOR THE COMBINED HANDLING OF CONTAINERS AND BULK MATERIALS

BACKGROUND OF THE INVENTION

1. Field of the Invention

The invention relates to a mobile harbor crane for the combined handling of containers and bulk materials, having an undercarriage and an upper carriage, which is mounted rotatably on the base frame of the undercarriage and on which a tower with a boom that can be pivoted about a horizontal axis is arranged.

2. Description of the Related Art

In the standard version, mobile harbor cranes of the type described above are designed for quays that allow relatively high axle loads of about 60 t/axle and surface loads of about 50 to 60 t/sq m under supporting plates provided.

For specific customers, the axle loads or surface loads can be reduced, if appropriate, by using additional axles and larger supporting plates.

In many parts of the world, however, the above measures on existing mobile harbor cranes are not technically feasible or adequate because the quays are extremely old. Even the construction of more modem quays, where standard concrete components used for building road bridges are generally employed, often allows only relatively low axle and surface loads.

SUMMARY OF THE INVENTION

It is the object of the present invention to design a mobile harbor crane for combined handling of containers and bulk materials in such a way that the mobile handling apparatus can be used with significantly reduced supporting loads for loading and unloading ships, even in seaports and inland harbors where the quays are not capable of taking the supporting loads of standard mobile harbor cranes.

To achieve the object, four support beams are connected pivotally to the base frame of the undercarriage, symmetrically to the longitudinal and transverse axes of the vehicle, in such a way that they can each be pivoted about vertical axes. The support beams are provided at their free ends with vertically acting leveling cylinders, by means of which the support beams are supported on the wheels of a plurality of traveling gear assemblies via balancers for uniform distribution of the supporting forces.

The mobile harbor crane according to the invention provides a new type of handling apparatus that is extremely mobile and flexible in application. There are no additional costs compared with a mobile harbor crane adapted specifically to customer requirements. Nevertheless, the balancer system ensures a uniform axle load matched to permitted quay loads and does so both in the transportation position and in the working position of the machine. Additional enlarged supporting plates are no longer required since the pedestal-like base frame of the undercarriage serves as a mounting for the four supporting beams, which transmit the supporting forces of the mobile harbor crane into the traveling gear assemblies via the balancers. At the same time, the traveling gear has a minimum support base during the transportation of the machine and a maximum support base when being used for work because the supporting beams can be pivoted into the working and transportation positions.

In a further refinement of the invention, it is envisaged that between the base frame and the balancer of each traveling gear assembly there is a coupling rod that forms a parallelogram linkage with the support beam and by means of which the traveling gear assembly can be adjusted parallel to the longitudinal axis of the vehicle in any pivoted position of the support beams. During and after the pivoting of the support beams, the coupling rods ensure that the wheels of all the traveling gear assemblies adopt a basic position in which they point in the same direction, namely in the direction of the longitudinal axis of the vehicle, irrespective of the size of the pivoting angle of the support beams.

To obtain stable conditions in the working position and in the transportation position, provision is made, according to a further feature of the invention, for the support beams to be capable of being fixed both in their extended working position and in their retracted transportation position by means of telescoping locking devices, which are arranged between the base frame and the free end of the support beams.

The support beams are adjusted with means belonging to the traveling gear itself since, according to another feature of the invention, it is proposed that to adjust the support beams between the transportation position and the working position, the axles of the traveling gear assemblies, which axles are pivotable through ±90°, can be adjusted under computer control and in a monitored manner on a common steering column, and the pivoting movements of the support beams can be performed by actuating the traveling gear drives. The position of the axles during this process is monitored by means of angular resolvers and pivoting takes place automatically in such a way that all the axles turn in the direction of the center of the machine (center of the rotary joint), for example. In this way, the support beams can be pivoted without additional hydraulic cylinders or similar devices.

The position of the axles (together with the wheels) is controlled by detectors of a control unit so that the alignment of all the wheels corresponds to the direction the crane will be moved. For example, if the crane moves straight ahead, all axles are oriented in parallel. To follow a curve, the axles are oriented so that the wheels follow an arc.

Since quays are often only relatively narrow and, after subtracting the necessary truck lane from the width of the quay, leave insufficient standing room to set up a standard-type mobile harbor crane with the required load capacity, the vehicular crane according to the invention offers, according to another feature of the invention, a free space in the longitudinal direction of the mobile harbor crane, between the traveling gear assemblies of the latter, to allow transportation vehicles to drive under the mobile harbor crane.

Because the mobile harbor crane according to the invention no longer requires separate support, the traveling gear that simultaneously serves as a support must be appropriately vibration-damped. To achieve this, the proposal is made, according to another feature of the invention, that the traveling gear assemblies of the mobile harbor crane have tires and, to damp vibration of the machine, the tires of the wheels are about 75% full of water. The vibration-damping effect of this measure is desired particularly when the machine is in the working position. Antifreeze is added to the water in the tires if required.

The invention provides a flexible and mobile handling apparatus that can be used cost-effectively and hence economically even on narrow quays where the subgrade is not very strong.

An exemplary embodiment of the invention is illustrated in the drawing and is described below.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
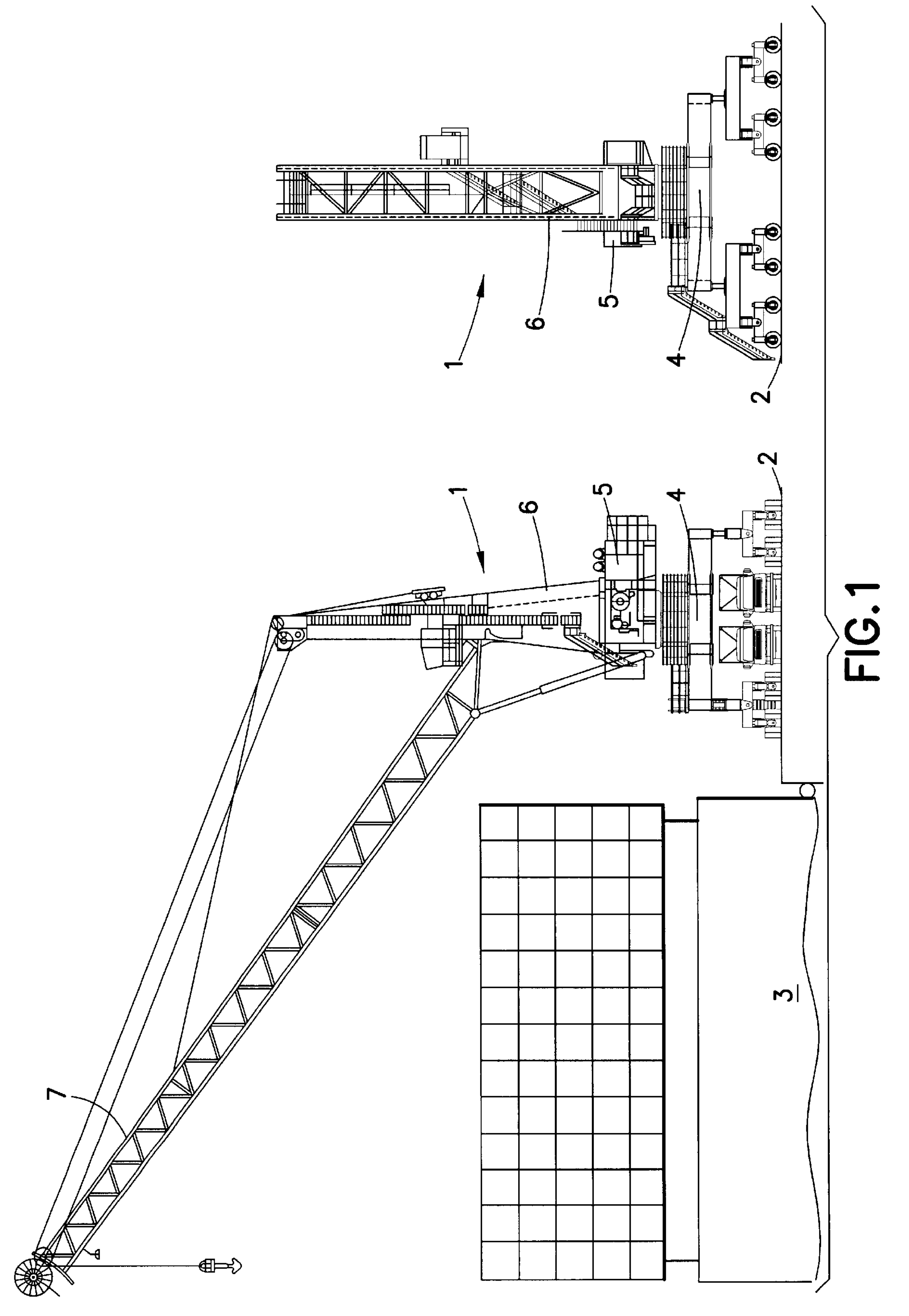
FIG. 1A is a side view of the mobile harbor crane in the working position.
FIG. 1B is a front view of the mobile harbor crane.

In FIGS. 1A and 1B, the mobile harbor crane 1 is used to serve a container ship 3 moored at a quay 2. The mobile harbor crane 1 comprises the undercarriage 4, the upper carriage 5, the tower 6 and the boom 7.

Figure 2:
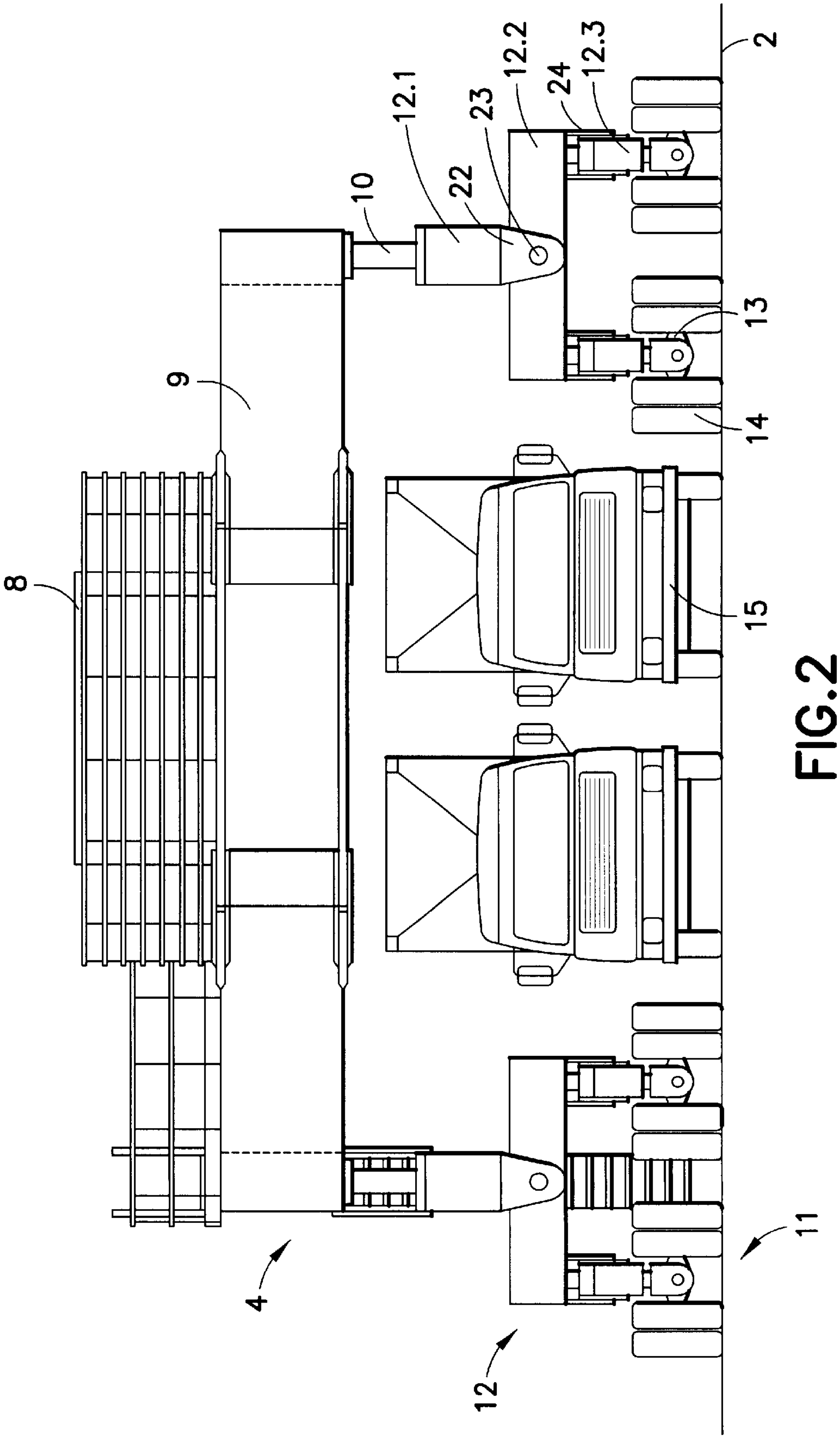
FIG. 2 is a detail view of FIG. 1A.

FIG. 2 shows the undercarriage 4 on the quay 2 in front view, the undercarriage comprising the base frame 8, to which the support beams 9 are pivotally connected. The leveling cylinders 10 are supported on traveling gear assemblies 11. Each traveling gear assembly 11 has a balancer system including balancers 12.1, 12.2 and 12.3, the axles 13 and the wheels 14. The balancers 12.2 are pivotably mounted with respect to balancer 12.1 by means of yokes 22 and shafts 23, and the balancers 12.3 are pivotably mounted with respect to balancers 12.2 by yokes 24 and shafts 25. The pivotable mountings permit the supporting forces acting on each traveling gear assembly to be uniformly distributed among its wheels. The clearance under the support beams 9 is sufficient to allow two trucks 15 to pass through.

Figure 3:
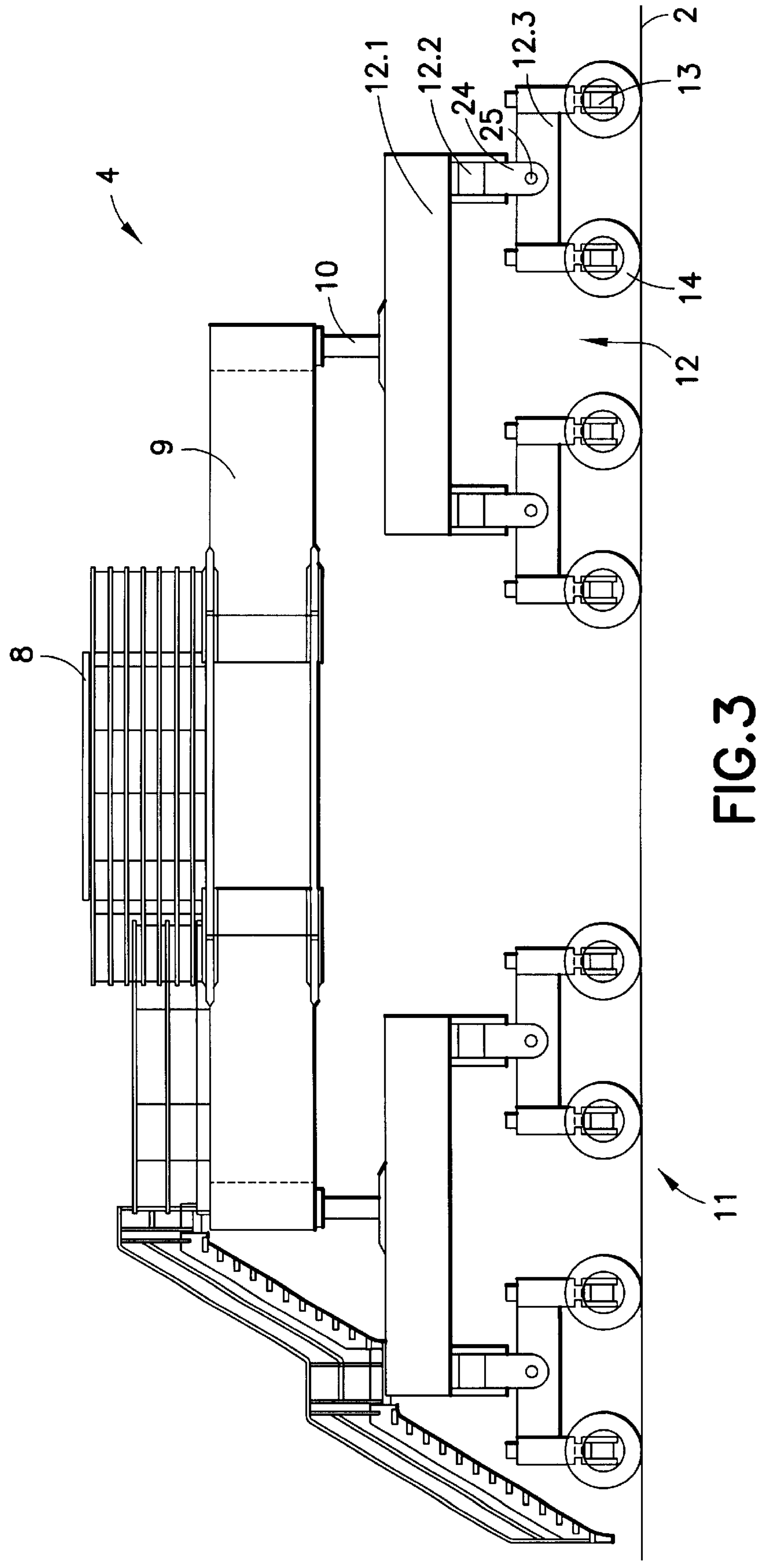
FIG. 3 is a detail view of FIG. 1B.

FIG. 3 shows the undercarriage 4 of the mobile harbor crane 1 in side view. Identical parts are denoted by identical reference numerals.

Figure 4:
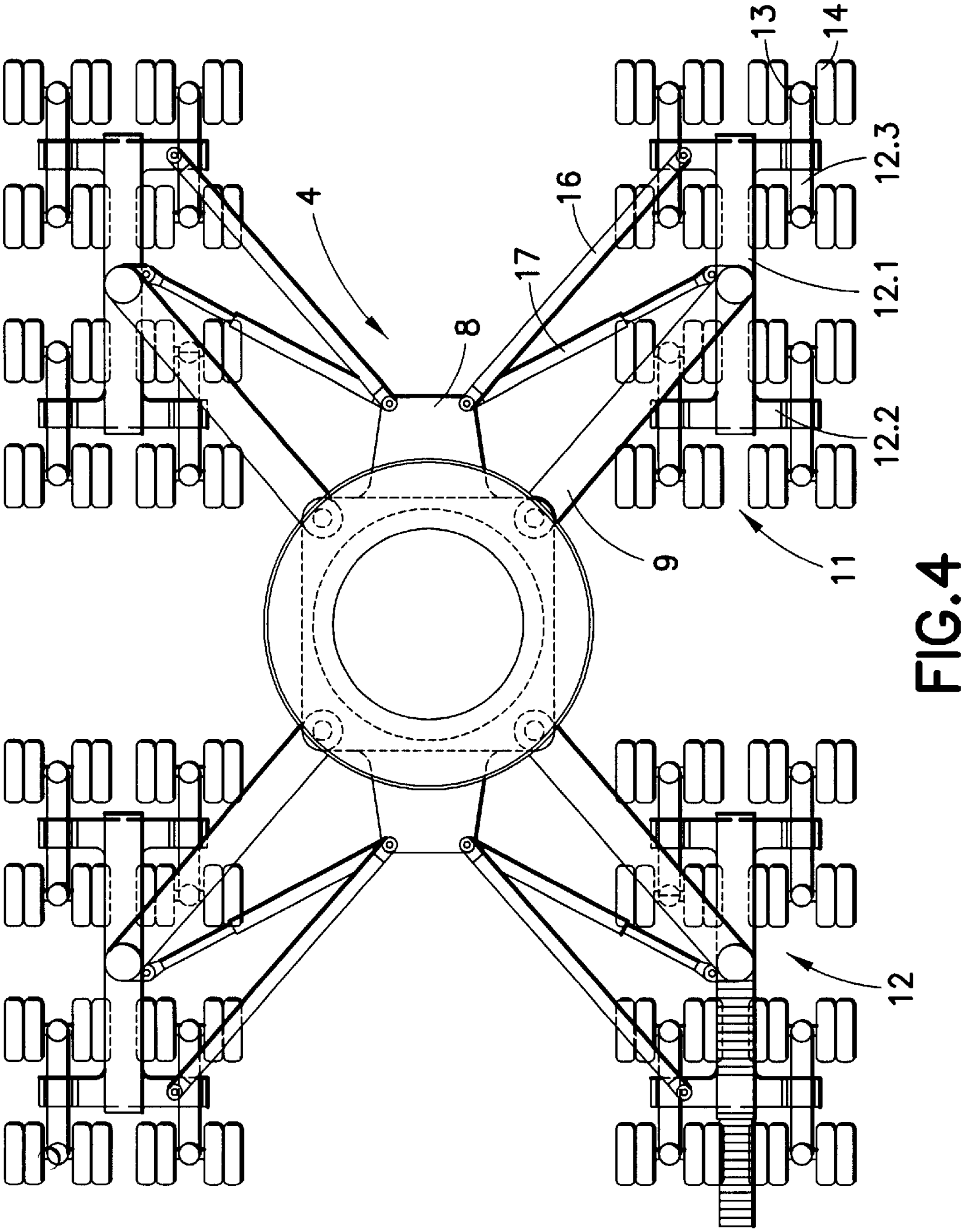
FIG. 4 is a plan view of the traveling gear in the working position.

FIG. 4 shows the undercarriage 4 with the base frame 8, the support beams 9 and the traveling gear assemblies 11. Each of the traveling gear assemblies 11 includes a balancer system 12 including the balancers 12.1, 12.2 and 12.3, eight axles 13 and the wheels 14. The four traveling gear assemblies 11 are each held parallel to the longitudinal axis of the machine by the coupling rods 16. The maximum support base for the working position is fixed in its end position by means of telescoping locking devices 17. Each device 17 is designed as a piston in a tube, which piston can be fixed in place by a socket pin.

Figure 5:
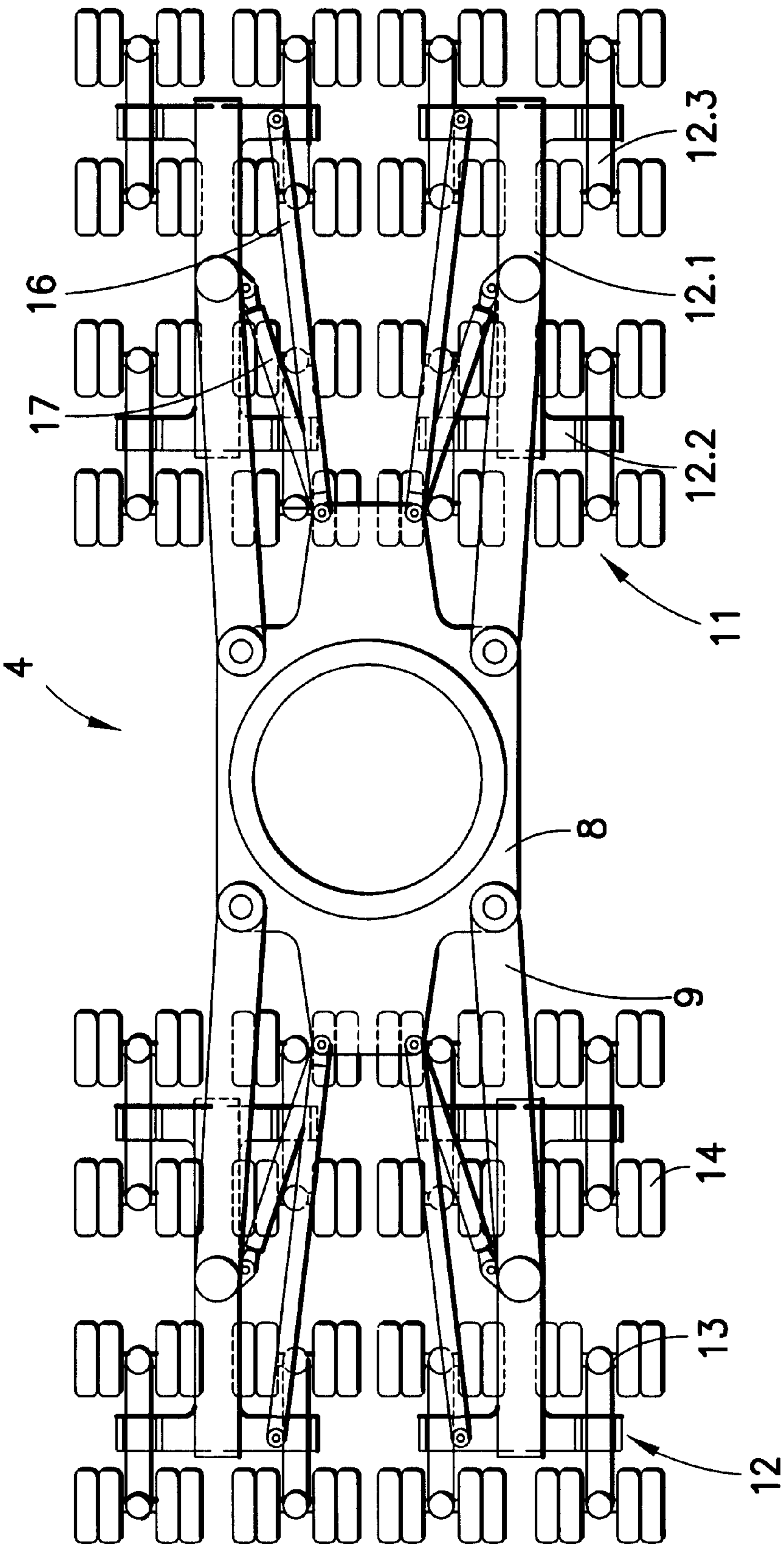
FIG. 5 is a plan view of the traveling gear in the transportation position.

FIG. 5 shows the machine in the transportation position, wherein the support beams 9 have been pivoted almost parallel to the longitudinal axis of the mobile harbor crane 1, significantly reducing the support width of the machine. The coupling rods 16 have fixed the four traveling gear assemblies 11 parallel to the longitudinal axis of the machine, with the result that the machine can now be moved in the longitudinal direction. As with the working position, the maximum support base for the transportation position can be fixed by means of the telescoping locking device 17.

Figure 6:
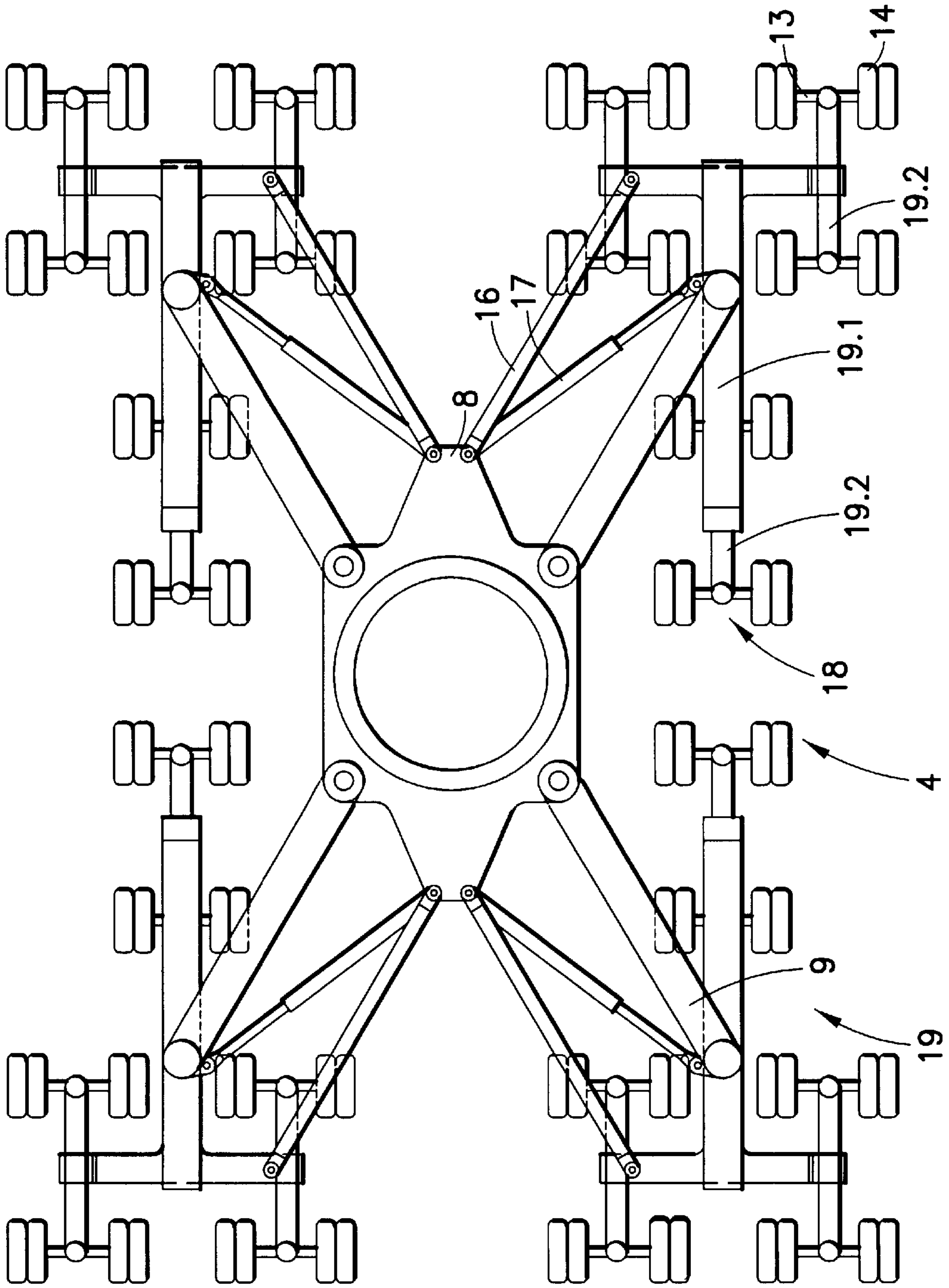
FIG. 6 is a plan view of different traveling gear in the working position.

FIG. 6 shows a machine with a lower load capacity, likewise in a plan view of the undercarriage 4. The lower transportation weight and lower transportation capacity allow a smaller number of axles, e.g. six axles 13 in each traveling gear assembly 18. Otherwise, identical parts are denoted by identical references.

Figure 7:
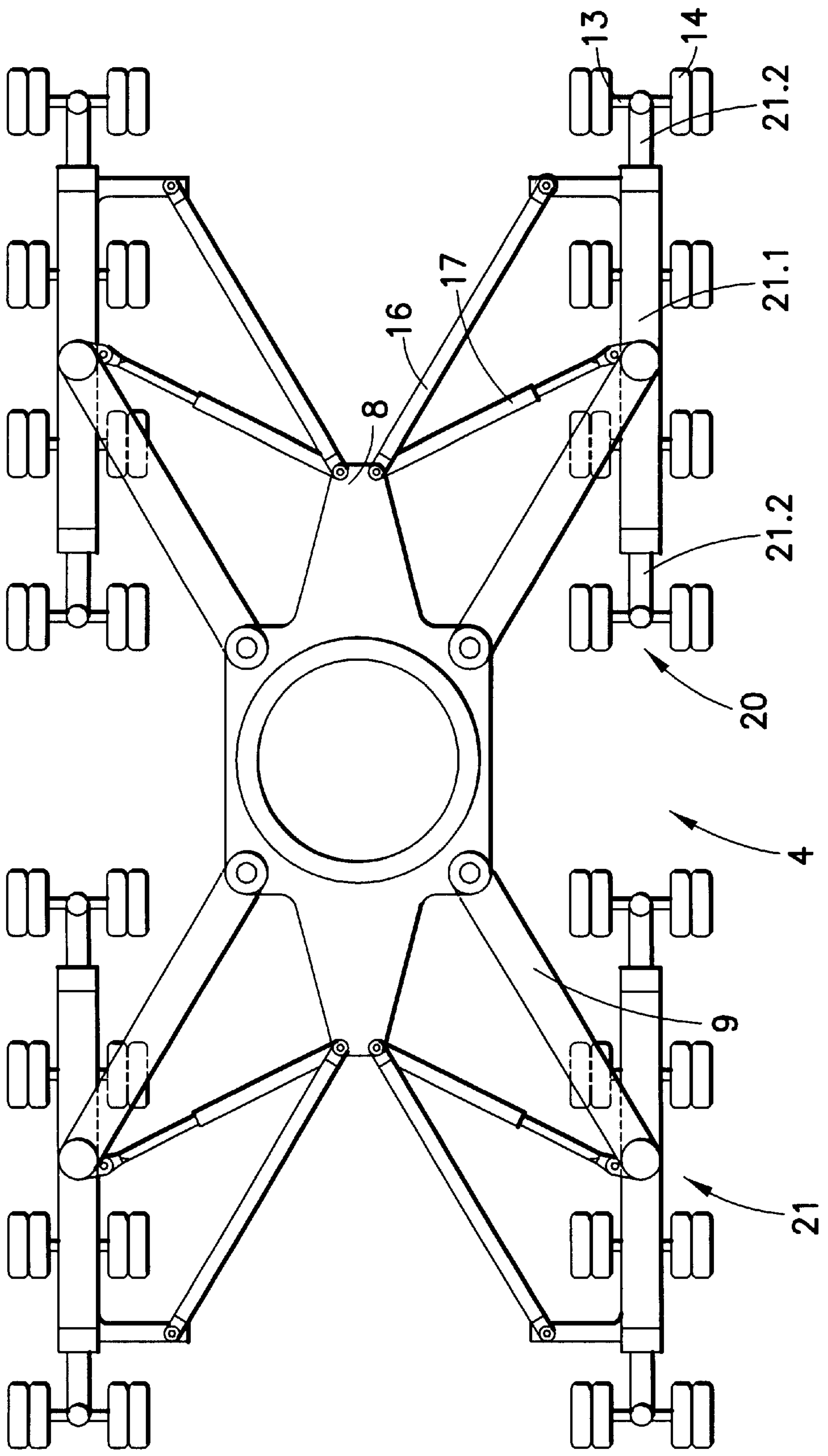
FIG. 7 is a plan view of yet another traveling gear configuration in the working position.

FIG. 7 shows a machine with an even lower load capacity and a lower transportation weight, which makes it possible to distribute the load between four axles per traveling gear assembly 20.

Figure 8:
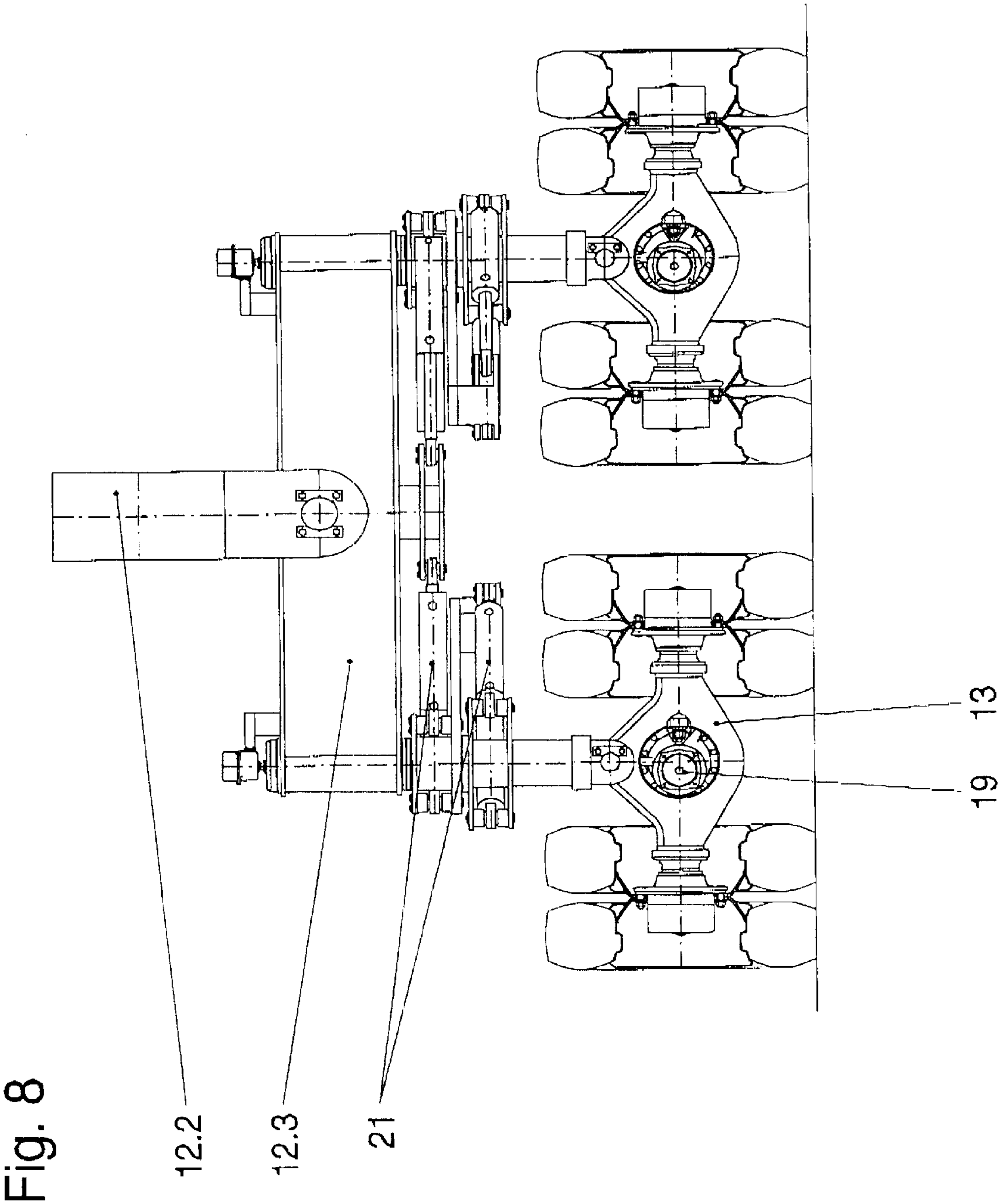
FIG. 8 is a front view of the traveling gear assembly showing the traveling gear drive.

FIG. 8 shows the traveling gear drive 19, which includes a hydraulic motor fitted to each axle 13. It is possible to pivot the support beams 9 in any direction by aligning the wheels 14 in the desired direction and actuating the gear drives 19. The wheels are aligned by actuating the hydraulic cylinders 21, which are linked to pivot arms fixed to the vertical pivot axes of the crane axles 13. More detail is provided in DE 10011594.2, which corresponds to U.S. 2001/0020558, incorporated herein by reference.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A mobile harbor crane for the combined handling of containers and bulk materials, said harbor crane comprising an undercarriage and an upper carriage which is rotatably mounted on the undercarriage, said upper carriage comprising a tower with a boom that can be pivoted about a horizontal axis, said undercarriage comprising a base frame having a longitudinal axis and a transverse axis, four support beams pivotally connected to the base frame, symmetrically to the longitudinal and transverse axes, each support beam being pivotable about a respective vertical axis between a retracted transportation position and an extended working position, each said support beam having a free end remote from the vertical axis, four traveling gear assemblies supporting respective said support beams by means of respective vertically acting leveling cylinders provided at the free ends of the support beams, each traveling gear assembly comprising a plurality of axles carrying a plurality of wheels and balancing means for uniformly distributing supporting forces acting on the assembly among its wheels, and four coupling rods pivotably connected to said base frame and to respective said traveling gear assemblies, each said coupling rod being parallel to a respective said support beam and forming therewith a parallelogram linkage, whereby said traveling gear assemblies remain parallel to the longitudinal axis in any pivoted position of the support beams.

2. A mobile harbor crane as in claim 1 further comprising a telescoping locking assembly pivotably connected between the base frame and the free end of each said support beam, whereby each said support beam can be fixed in both the extended working positions and in the retracted transportation position.

3. A mobile harbor crane as in claim 1 wherein each said axle is pivotable through ±90°, said axles being commonly pivotable under computer control, each said traveling gear assembly comprising a traveling gear drive acting on at least one of the axles, said support beams being pivoted between the retracted transportation position and the extended working position by actuating the traveling gear drives.

4. A mobile harbor crane as in claim 1 wherein when the support beams are in the extended working position, the traveling gear assembles are in pairs which are spaced apart sufficiently to allow vehicles to pass under the base frame in a longitudinal direction.

5. A mobile harbor crane as in claim 1 wherein each said wheel comprises a tire which is filled about 75% by volume full of water.

* * * * *